May 24, 1966  E. L. HIXSON  3,252,225
SIGNAL GENERATOR INDICATING VERTICAL DEVIATION
Filed Sept. 4, 1962  4 Sheets-Sheet 1
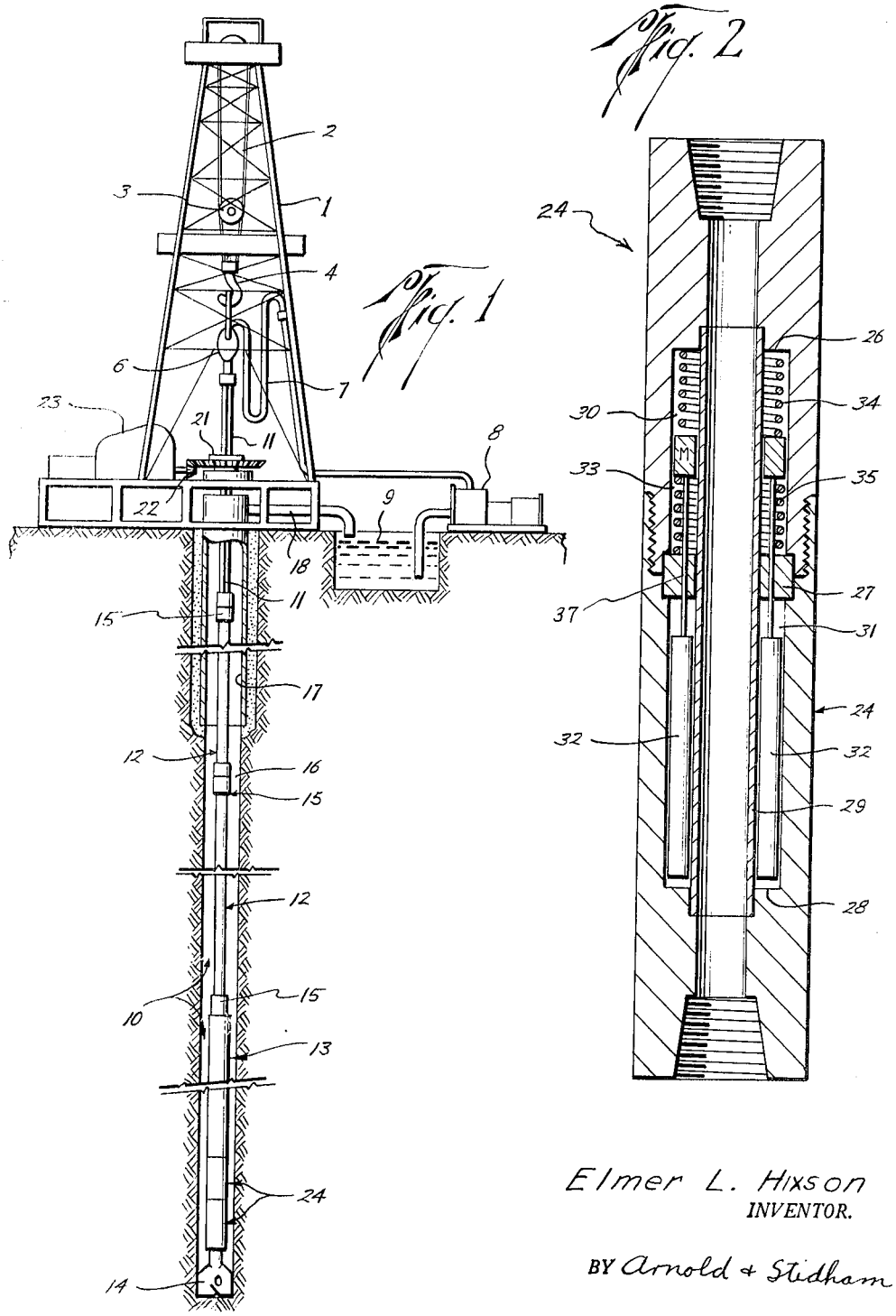
Elmer L. Hixson
INVENTOR.
BY Arnold & Stidham
ATTORNEYS May 24, 1966 E. L. HIXSON 3,252,225
SIGNAL GENERATOR INDICATING VERTICAL DEVIATION
Filed Sept. 4, 1962 4 Sheets-Sheet 2
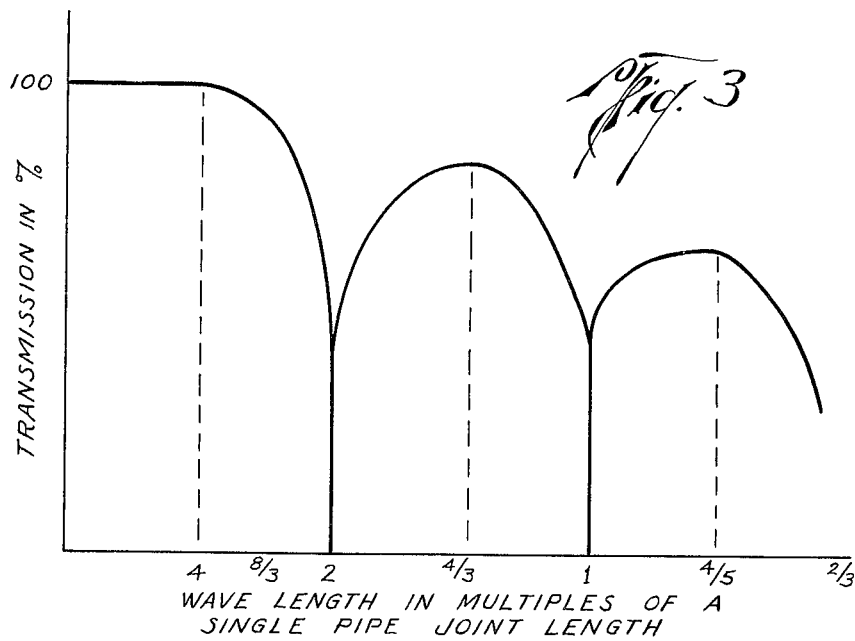
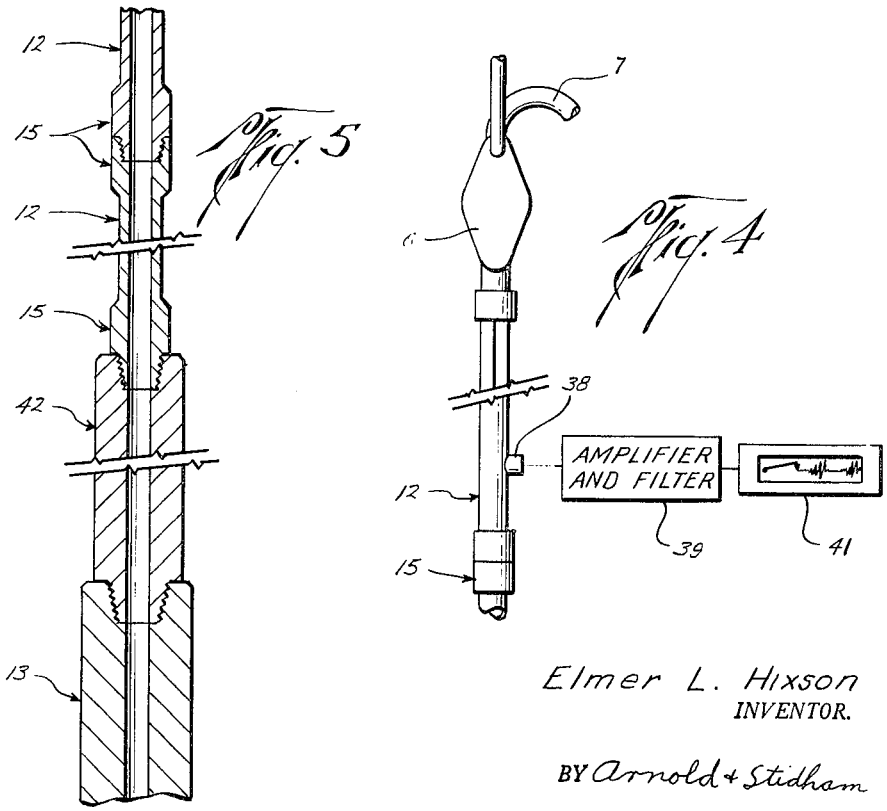
Elmer L. Hixson
INVENTOR.
BY Arnold + Stidham
ATTORNEYS

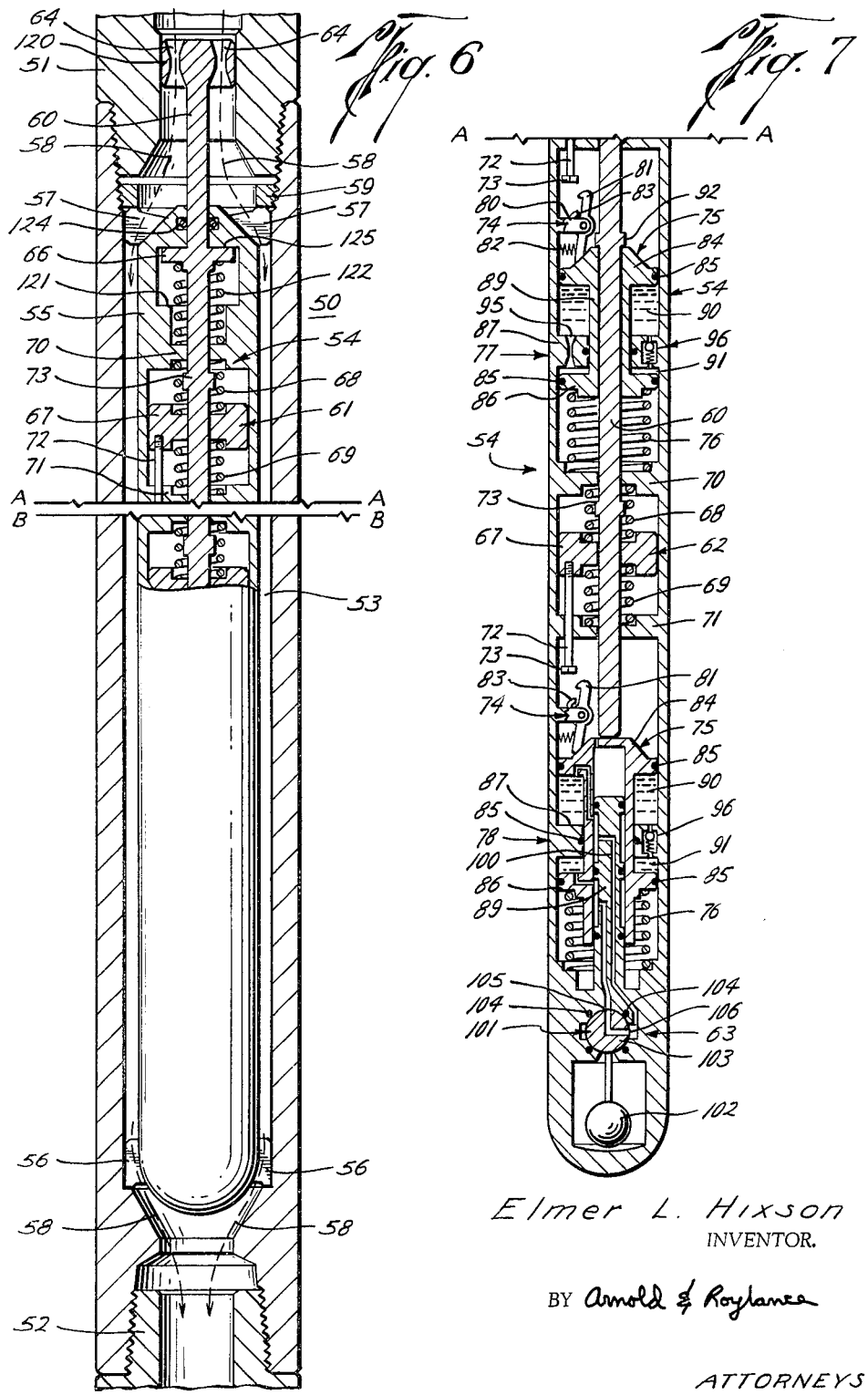

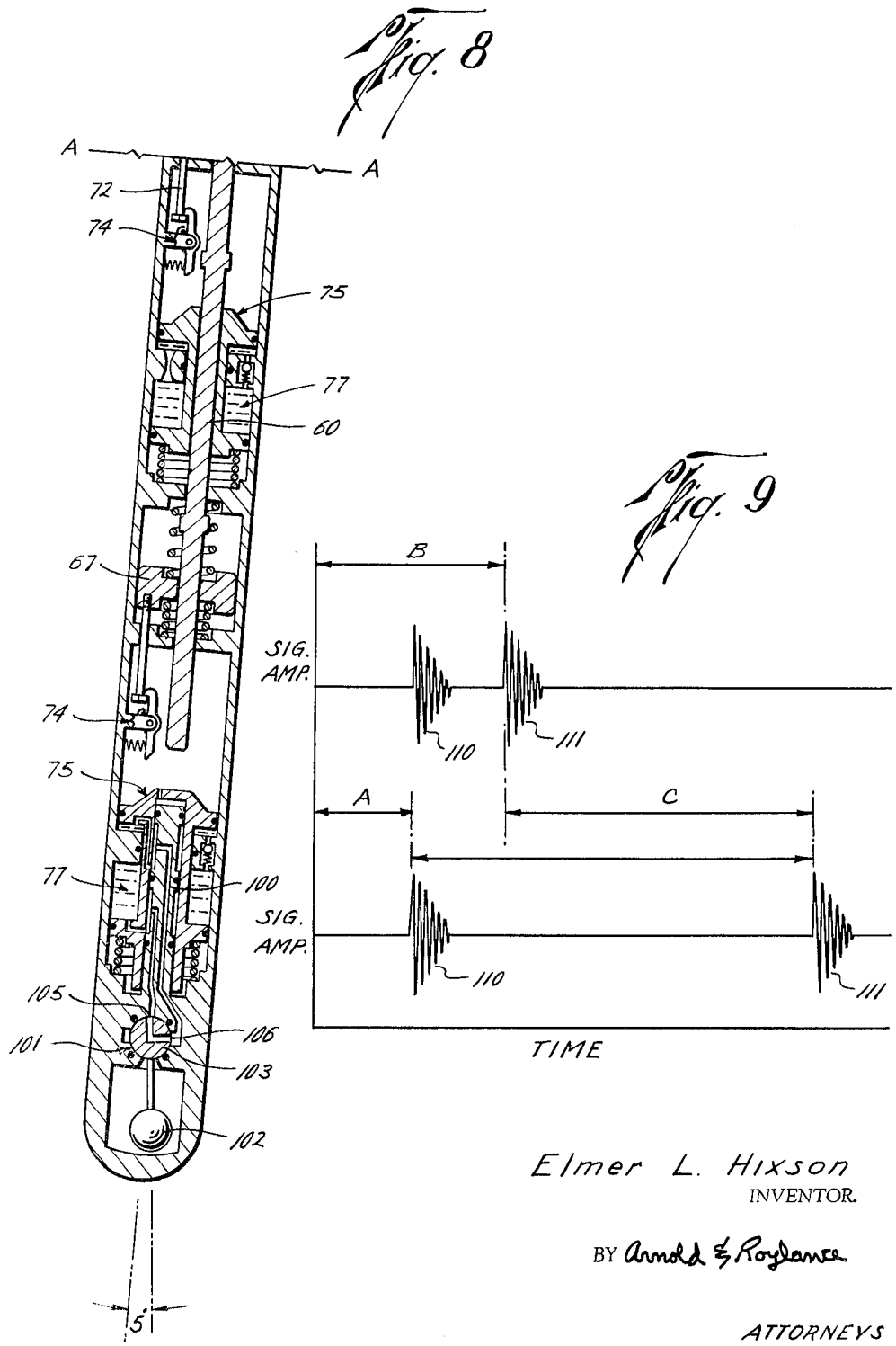

United States Patent Office 3,252,225
Patented May 24, 1966

3,252,225
SIGNAL GENERATOR INDICATING VERTICAL
DEVIATION
Elmer L. Hixson, Austin, Tex., assignor to Ed Wight and
Wilson L. Richards, both of Austin, Tex.
Filed Sept. 4, 1962, Ser. No. 221,671
3 Claims. (Cl. 33—205)

The present application is a continuation-in-part application of Serial No. 783,846, filed December 30, 1958, in the name of Elmer L. Hixson as inventor for Sonic Signal Transmission.

This invention relates to means for and methods of transmitting information in sonic form along a string of pipe in a well, and is most particularly useful in connection with devices for determining the angular positions of objects in wells and similar sensing devices.

While any form of intelligence (temperature, pressure, inclination, etc.) sensed at the bottom of a well may be transmitted by the use of this invention, the invention is here described for illustrative purposes in connection with devices of the type and for the purposes indicated in such patents as Hassler 2,380,520, Irwin et al. 2,303,360, Mattingly et al. 2,255,721, Weinstein et al. 2,309,877 and Goodwin et al 2,572,332 and references therein cited. From those and similar references, it is apparent that such information as the angularity of the lower end of a string of well pipe may be sensed and converted into a sonic signal, and such signal may be a series of timed transient pulses, the timing of which carries the intelligence, or the signal may be of varying frequency with the information carried in the frequency variations.

In practice, however, such equipment which relies upon the transmission of sonic signals through a string of drill pipe has found no practical commercial success. The most apparent reason for this lack of commerical success is that the signals generated, in the transmission up the typical drill string, are too greatly attenuated. In fact work on this invention has revealed that ordinary uses of the devices heretofore known result in attenuation of the signals below the usable level in as little as a very few hundred feet of typical drill pipe, thus making the devices totally inoperable in today's multi-thousand foot wells.

Thus an object of this invention is to provide improved means for and method of transmitting sonic signals, however generated, over great lengths of pipe in a well, to the end that sonic (i.e., pressure wave) signal transmission may be rendered practical and commercially usable in the typical oil wells of today.

Other objects are apparent from the following description and accompanying drawings wherein:

FIGURE 1 is a schematic representation of a typical well with a drill string therein, some parts being illustrated in section.

FIGURE 2 is a diagrammatic sectional representation of a "sub" or pup joint and one type of signal generator that may be used with this invention.

FIGURE 3 is a diagram of certain wave propagation characteristics in drill pipe strings as a function of the relationship between wave length and pipe joint length.

FIGURE 4 is a schematic representation of the detector and appurtenant circuitry of a preferred embodiment of the invention.

FIGURE 5 is a schematic vertical sectional view illustrating an impedance transformer.

FIGURE 6 is a diagrammatic sectional representation in elevation of a modified form of sub showing another form of signal generator in partial cross section, the portion of the sub between lines A—A and B—B being removed to enable the illustration of the entire mounting arrangement.

FIGURE 7 is a diagrammatic sectional representation in elevation of the sub illustrated in FIGURE 6, showing the portion of the signal generator from line A—A to the bottom end (as viewed in FIGURE 6).

FIGURE 8 is a diagrammatic sectional representation of the sub illustrated in FIGURES 6 and 7 disposed at an angle with respect to the vertical (as viewed in FIGURE 8).

FIGURE 9 is a time graph illustrating the relationship between pulses produced by the signal generator.

FIGURE 1 schematically illustrates a typical rotary drilling system. On the surface of the ground is a derrick 1. Suspended therefrom by cables 2 is a traveling block 3 upon which is mounted a block hook 4.

Supported by the block hook 4 is a swivel 6, connected by a hose 7 to the discharge side of a drilling mud pump 8 which takes its suction from a mud sump 9.

Depending from the swivel 6 is a kelly (being a heavyweight pipe of square cross-section) 11. Many "joints" 12 (e.i., discrete pieces or lengths) of drill pipe constitute a string of pipe depending from the kelly 11. Near the lower end of the string of drill pipe 12, are joints of extra heavy pipe known as drill collars 13. To the lower end of the drill collars 13 is secured a drill bit 14.

The connection between the various pieces of drill pipe 12 that make up the drill string, are known as collars, couplings or commonly as "tool joints." They will hereinafter be referred to as tool joints 15 to distinguish them from drill collars 13 and other collars to be discussed.

The entire string including kelly 11, drill pipe 12, drill collars 13 and in appropriate instances other miscellaneous items such as reamers, stabilizers and the like that may be connected in the string, may be thought of as the drill string 10.

The drill string 10 is illustrated in a well bore or borehole 16 which may penetrate into the ground several thousand feet. Near the top of the well, the well bore 16 is lined with a surface casing 17 which protrudes slightly above the ground level, and is connected through a pipe 8 to discharge fluids from the borehole 16 into the mud sump 9.

On the derrick floor is mounted a rotary table 21, adapted to engage and rotate the kelly 11. The rotary table 21 is driven by a pinion 22 which is in turn driven from an appropriate power source, such as the draw works 23.

In operation the draw works 23, acting through the pinion 22 and rotary table 21, rotates the kelly 11 which is the top part of the drill string 10. Simultaneously with the rotation of the drill string 10 and rotation of the drill bit 14 with the drill string, a drilling fluid commonly referred to as drilling mud is drawn from the sump 9, discharged by the pump 8 through the hose 7 and swivel 6 into the inside of the kelly 11 and drill string 10. The mud is discharged through holes in the drill bit 14, washing the bit and picking up cuttings. The mud then circulates up through the annulus 16 between the drill string 10 and the walls of the hole and finally through the casing 17 and pipe 18 back into the mud sump 9 where the cuttings settle out of the drilling mud.

When it is desired to sense something at the bottom of the hole, as for example, the deviation of the well from the vertical, the string may carry a pup joint or "sub" 24 immediately above the bit 14, which sub houses and carries the sensing apparatus and means for causing it to generate and transmit the desired intelligence signal.

FIGURE 2 illustrates a sub 24, housing a sonic or pressure wave signal generator of a type that may be used in accordance with this invention. The sub 24 is provided with an upper shoulder 26, intermediate shoulder 27 and lower shoulder 28. Connecting the internal edges of the three shoulders may be a cylindrical sleeve 29. Thus the sleeve 29 and sub 24, define a signal generator chamber 30 between the shoulders 26 and 27, and a further signal control chamber 31 between the shoulders 27 and 28, while providing a path for mud circulation through the inside of the sleeve 29.

Any conventional sensing element and signal control apparatus, such as those illustrated in the references cited above, may be engineered to fit into the chamber 31. Thus in chamber 31 is found a box 32 which is representative of sensing and signal control apparatus of any desired type, adapted to actuate a signal generator 33 housed in the chamber 30.

It will be understood that while the term "sonic" is used in various places herein, that term is always used in the generic sense to mean pressure wave and without regard to whether the frequency of such wave be within or without the range audible to the ear of either human or any particular animal.

The schematic illustration of a sonic or pressure wave signal generator 33 comprises a mass M of an annular form, suspended between two springs 34 and 35. The upper spring 34 abuts at its upper end the shoulder 26; the lower spring 35 abuts at its lower end the shoulder 27. Thus the springs 34 and 35 (which may be considered as one in this system) and the mass M constitute a vibratory system which can be caused to vibrate at any desired frequency by the proper selection of the mass and the springs. The frequency may be calculated from the formula $$f = \frac{\sqrt{k/m}}{2\pi}$$

where $f$ is the frequency, $k$ is the spring constant and $m$ is the effective vibrating mass including a portion of (about ⅓ of) the mass of the springs. Since wave length in any given medium is a function of frequency, by the choice of frequency it is possible to choose the wave length of the signal, and in this invention it is really wave length that is of the greater significance.

In considering the remainder of this disclosure, note that the concern is not with frequency of pulses, i.e., rate of recurrence of pulses, but rather with the particular wave length which constitutes the signal or pulse itself (regardless of how the pulses are handled to effect transmission of intelligence).

Means must be provided by which the signal control apparatus 32 may actuate the mass. This may take the form of one or more linkage rods 37 which may be actuated to pull the mass a short distance, and then sharply release it for free vibration, or to push the mass and then be released for free vibration. If the rod 37 is secured to the mass and vibrates with it, the mass of the rod must be included in the mass $m$ in calculating the frequency by the above quoted formula.

In the preferred signal generator it is preferred that the vibrations be as purely as possible longitudinal vibrations in the direct line of the drill string 10, such as occurs with the signal generator illustrated in FIGURE 2.

The apparatus illustrated in FIGURES 6, 7 and 8 is another embodiment of a sub arranged to transmit sonic or pressure wave signals from the bottom of a well hole in a relationship that carries the intelligence on the inclination of the drill string. The apparatus includes a tubular sub 50 having an open upper end (as viewed in FIG. 6) internally threaded to attach to the lower end of a drill collar 51. The other end of the sub 50 is also open and internally threaded to receive the upper end of drill bit 52. Within the sub 50 is a central, cylindrical cavity 53 that opens to the aperture of the drill collar 51 and to the central passage of the drill bit 52. Thus, mud passing through the drill string also passes into the sub 50 and through it to the drill bit 52 for movement into the borehole.

Within the sub central cavity 53 is disposed a sonic or pressure wave signal generator 54 having a cylindrical housing 55 of smaller outer diameter than the inner diameter of the sub central cavity 53 and spaced from the sub central cavity walls by lower studs 56 and upper studs 57. The mud passes freely around the outer surface of signal generator housing 55 in the direction of arrows 58. The lower studs 56 are fixed to and spaced at equal distance about the sub 50, while the upper studs 57 are free and unconnected and pressed against the upper end of housing 55 by an external thread ring 59 engaged with internal threads in the opening at the upper end of sub 50 and adjusted to clamp the signal generator housing 55 and securely hold it in place against the lower studs 56.

In general terms the sonic or pressure wave signal generator 54 can be considered as comprising an actuating rod 60 that cocks a reference pulse oscillator 61 and a variable delay pulse oscillator 62 (see FIGURE 7), and an inclination sensing mechanism 63 (see FIGURE 7) that controls the initiation time of the variable delay pulse oscillator 62.

The actuating rod 60 has a cylindrical head 120 disposed at its upper end extending into the aperture of the drill collar 51 provided with axially extending ports 64 through which the mud passes, creating an actuating force on the head 120. The lower portion of actuating rod 60 extends substantially axially into the signal generator housing 55 with seals 124 to prevent leakage into signal generator housing 55 and has an upper shoulder 66 that engages signal generator housing end shoulder 125, limiting the upper movement of the actuating rod 60, while permitting movement in the downward direction to a limit defined by signal generator housing shoulder 121, under the action of the mud. The actuating rod 60 is biased upward forcing shoulder 66 against housing end shoulder 125, by a spring 122 acting against a signal generator housing shoulder 70.

Each of the pulse generators 61 and 62 are essentially the same and common reference numerals will be used for like parts. More particularly, each of pulse generators 61 and 62 comprises a cylindrical mass 67 free to move along the lengthwise dimension within housing 55 with the actuating rod passing freely, axially therethrough, against the force of two compressed springs 68 and 69 disposed on opposite sides of mass 67. Springs 68 and 69 are compressed against housing shoulders 70 and 71, respectively. Attached to mass 67 is a linkage rod 72 having a lip 73 at its outer end (FIGURE 7).

As shown in FIGURES 6 and 7, the mass 67 is normally disposed in a central position within the signal generator housing 55. This is termed the "uncocked" position. Actuating rod 60 has a shoulder 73 disposed between mass 67 and housing shoulder 70. As the actuating rod 60 moves downward, under the force of the mud flowing through the drill string, the actuating rod shoulder 73 moves toward the mass 67 from a spaced position and forces the mass 67 to further compress spring 69.

The linkage rod 72 moves downward with mass 67, beneath a latch mechanism 74.

The latch mechanism 74 comprises a mounting arm 80 extending from the inner wall of signal generator housing 55 to support pivotally a key member 81 at approximately its midpoint. The upper end of key member 81 is biased inwardly by a spring 82 at its lower end to force the upper end of key member 81 toward the signal generator housing 55 to a limit point determined by a stop member 83. The upper end of key member 81 is held in an outward position, when actuating rod is in its uppermost position, by a piston 75 in contact with the lower end of key member 81 (see FIGURE 7).

As the mass 67 is moved downward by actuating rod 60, the actuating rod 60 also forces piston 75 to move downward, releasing the latch mechanism 74 from its normally open position and permitting it to grasp the linkage rod lip 73 and lock the mass 67 in a downward position, cocking the pulse oscillators 61 and 62. The piston 75 is acted upon by a spring 76 to force the piston in an upward direction, acting against the signal generator housing shoulder 70. Thus, the locking mechanism 74 is normally in an open condition, as shown in FIGURES 6 and 7 when the mud circulation has ceased and each of the pulse oscillators 61 and 62 have been released by control mechanisms 77 and 78, respectively. The actuating rod shoulder 73 moves up, out of the way, before mass 67 is released, to permit a full amplitude of vibration.

Up to this point the reference pulse generator 61 and the variable delay pulse generator 62 are identical in construction and operation. The chief differences from this point on, lie in the means for controlling the operation of the sonic or pressure wave producing vibrating mass 67 to transmit the required intelligence to the top of the well hole. Each of the sonic or pressure signals, of course, is transmitted at the frequency selected in accordance with the teaching of the main body of the patent application.

The control mechanism 77 for the reference pulse oscillator 61 comprises the piston 75 having an upper cylindrical head 84 slidably mounted for movement within housing 55 and having appropriate seals 85 at its outer edge to prevent leakage and a lower head 86 disposed below a central partition 87 formed in signal generator housing 55. Connecting the heads 84 and 86 is a tubular central body 89 of smaller diameter than the heads 84 and 86 that freely receives actuating rod 60 in its central passage. The piston heads 84 and 86 and central body 89, together with the adjacent inner wall of housing 55 and central partition 87, define chambers 90 and 91 containing a suitable fluid, such as oil.

The reference pulse oscillator piston 75 is moved downward axially in signal generator housing 55 by a shoulder 92 on actuating rod 60 which engages the upper end of piston head 84. The actuating force is derived from the mud flow through sub 50. The movement of piston 75 of variable pulse generator 62 is accomplished by the lower end of actuating rod 60 that engages the top of piston head 84

The return movement of piston 75 for the reference pulse oscillator 61 is controlled by a fluid circuit comprising a flow passage 95 between chambers 90 and 91 and a one way valve 96 which permits flow of fluid only from chamber 90 to chamber 91. With the valve 96 in the fluid circuit, fluid flows freely from chamber 90 into chamber 91 when the piston 75 is moved downward. However, when the force on actuating rod 60 is released, as the mud flow is terminated, the piston 75 returns to its normal position in a fixed time period determined by the metered fluid flow through passage 95. Piston 75 returns to a position where the latch mechanism 74 is released and the reference pulse oscillator initiates a sonic or pressure impulse that travels to the top of the well hole.

The control mechanism 78 for the variable delay pulse oscillator 62 has the same general arrangement of piston 75 and housing central partition 87 as reference pulse oscillator 61. The chief difference is in the method of controlling the time it takes for the piston 75 to return to its normal upper position and release the latching mechanism 74. One of the differences is that the movement of piston 75 is accomplished by the lower end of actuating rod 60 that engages the top of piston head 84.

More particularly, instead of having a flow passage such as 95 mentioned previously, the central body 89 of variable delay pulse oscillator 75 has a fluid circuit 100 consisting of a continuous series of fluid passages that exit only to chambers 90 and 91. Within the fluid circuit 100 is an inclination sensing mechanism 63 comprising a valve 101 which is controlled by a pendulum 102. Valve 101 is arranged to vary the flow of fluid between chambers 90 and 91 in proportion to the inclination of pendulum 102.

Valve 101 includes a spherical distribution head 103 rotatably mounted within signal generator housing 55 and provided with seals 104 to prevent side leakage between exit ports 105 and 106 connected by a single passage in the distribution head 103 and disposed at substantially right angles to each other. The pendulum 102 is attached to distribution head 103, rotating the distribution head 103 to a new orientation for each different inclination. Port 105 is connected to the fluid circuit 100 by a passage having the same diameter, while port 106 is connected in the fluid circuit 100 by a passage having a substantially greater diameter. The significance of the size of connecting port 105 and the associated passage is that rotation of the distribution head 103 alters the passage size between the distribution head 103, while no change in the passage size is introduced at the port 106. Thus, the amount of fluid flowing in fluid circuit 100 is proportional to the inclination angle of pendulum 102, providing a sensing mechanism responsive to the inclination of the lower end of the drill string.

FIGURE 8 illustrates the arrangement of sub 50 in an inclined position, where the pendulum 102 is disposed at an angle of five degrees to the vertical (as viewed) and the port 105 has a reduced communicating passage with the fluid circuit 100. The masses 67 are shown in their cocked position, awaiting the controlled return of pistons 75 to release the latching mechanisms 74.

A summary of the operation for apparatus disclosed in FIGURES 5 through 7 is aided by reference to the graph of FIGURE 9, illustrating the time relationship for the reference pulse and variable delay pulse produced by sonic or pressure signal generator 54. As the drilling operation continues, it may be desirable to take a reading of the inclination of drill bit 52. The sub 50 is connected adjacent the drill bit in the drill string and the inclination thereof corresponds to the inclination of the drill bit 52. During the drilling operation the mud flows through the sub 50 forcing the actuating rod 60 downward to cock the masses 67 of the reference pulse 61 and the variable delay pulse oscillator 62. At the time a reading is desired, the mud circulation is stopped, allowing the actuating rod 60 to return to its upper limit primarily under the action of the spring 122. Movement of piston 75 of the reference pulse oscillator 61 takes a preset time, represented by the time division A in FIGURE 9, before the reference sonic or pressure impulse 110 is produced.

The variable delay pulse oscillator 62 does not transmit until after the reference pulse oscillator 61 transmits because the fluid circuit 100 is arranged so that a longer time is required for the piston 75 of variable delay pulse oscillator 62 to return to its upper limit, even if the pendulum 102 is in a vertical position-maximum passage communication with port 105. The minimum delay time for the variable delay impulse 111 is identified as time interval B in FIGURE 9 and represents a vertical inclination for the drill bit 52. The variable delay impulse may be produced anywhere in the time span C, depending on the inclination of pendulum 102. The time delay between the impulses 110 and 111 which can be recorded or otherwise suitably displayed is an indication of the information variable, the inclination in this illustrative embodiment. The sonic or pressure wave signal generator 54 is in the condition shown in FIGURES 6 and 7 after both oscillators have fired and before the mud flow is initiated. After the mud flow is started each oscillator is automatically prepared for another reading by the actuating rod 60 cocking masses 67.

Assume now that drilling, i.e., rotation of the drill string 10 is stopped for some sort of survey or measurement, and that a sonic generator such as that illustrated in FIGURE 2, or FIGURES 5 through 7, has been located at the lower end of the drill string 10 and adapted to be operated by some signal control device. Upon actuation, the mass M (or 67 for the embodiment of FIGURES 5 through 7) vibrates, generating a generally sine wave signal at a given fundamental frequency, which signal dies out as the mass comes to rest. It the drill string were a smooth continuous length of pipe, without joints or changes in cross sectional area, the signal would travel a great distance along such a string of pipe, and be detectable at the surface by conventional detector means.

Thus, when surveys are being conducted and detection is desired, a detector indicated by the box 38 may be secured to the kelly 11 or drill pipe 12 to pick up the signal and feed it through an amplifier 39 to an indicator 41 (FIGURE 4). Preferably, the amplifier includes a filter on one side or the other thereof, or is of such design as to itself discriminate against frequencies other than the fundamental of the signal generator 33. It might also be noted that while a recording type indicator 41 is illustrated, the faster responding oscilloscope type indicator would likely be preferable in many instances.

It has been discovered that the problem of excessive attenuation upon transmission along only a short string of drill pipe, arises because the cross sectional area of the transmission medium, namely the drill string, varies markedly, and that at each area variation, much of the signal is reflected rather than conducted.

Observe that in the drill string 10 from the bit 14 to swivel 6, the signal is applied first at the cross-sectional area of the sub 24, which cross sectional area presents that we will characterize as one "impedance" to the signal. (The Young's modulus of the material out of which the parts are made also effects the impedance but since we are in this example concerned always with steel parts we can limit our discussion to cross sectional area as the cause of changes in impedance.)

Thence from the sub 24 the signal passes to meet the cross sectional area of the heavy walled drill collar 13, and another impedance. Thence from the drill collar 13, the signal meets a tool joint 15 at the lower end of the first joint of drill pipe 12, and this tool joint 15 presents still another cross sectional area and impedance. When the signal reaches the body of the first joint of drill pipe 12 it meets still another cross sectional area and a different impedance, and at every tool joint 15 up the string, changes in impedance are met, until still another cross sectional area is met in the kelly 11.

It is here to be noted that the drill collars 13, having no tool joints of differing cross sectional area at the ends, usually extend several hundred feet and as a group have one characteristic impedance, and that the drill pipe 12 usually extends several hundred to several thousand feet and, with the tool joint discontinuities in the drill pipe section, has its own characteristic impedance differing markedly from that of the drill collars 13 as a group.

Since each separate piece of material in the string has its "impedance," each connection between two pieces of material constitutes an impedance match or mismatch. The connections between joints of drill collar 13 are substantially matched and the bulk of the signal applied to such connections are transmitted therethrough.

But impedance mismatches operate to reflect some of the signal and transmit less than arrived at the mismatch. At such connections as between a drill collar 13 and a joint of pipe 12, reflections on the order of 75% of the signal are common and even at connections between two joints of drill pipe connected by relatively short length tool joints, 65% of the signal is commonly reflected and only 35% transmitted.

Thus it is apparent why signals, of even very great amplitude, are attenuated below detectable levels, after relatively short journeys through drill strings 10.

Study of the sonic signals in drill strings and attenuation phenomena therein, has revealed two different but related problems. The first is the problem presented by signal reflections at regularly spaced impedance mismatches constituted by members or portions of the string which are short in length relative to the wave length of the signal. That is, the first problem is the reflections by the short tool joints 15 in the string of joints of drill pipe 12.

The second problem is that presented by the large reflection at the connection between the drill collars 13 as a group and the joints of drill pipe 12 as a group, each of which groups has its own characteristic impedance which are mismatched at the point of their connection.

In accordance with this invention these problems are solved by the proper choice of wave length of the signal in relation to length of the joint of drill pipe, and by the use of impedance transformers of a particular type between the two connected sonic conductors of different characteristic impedances, namely the group of drill collars 13 and the group of joints of drill pipe 12.

It has been found that the conduction of the signal through the various impedance mismatches at tool joints 15 in the string, is a function of the ratio of wave length of the signal to the length of the piece of drill pipe, the medium, which is carrying the signal.

Since a typical drill string is dominated by the 30-foot (or sometimes 40-foot) long "joints" or lengths of drill pipe and drill collars, it has been found permissible in most applications to let the length of the individual joints of drill pipe 12, control the wave length.

FIGURE 3 illustrates an interesting curve in this connection. It is illustrative of the conduction of signal through a string having regularly spaced short impedance mismatches which the tool joints 15 present between joints of drill pipe.

If the wave length of the signal is on the order of four times longer than the distance between impedance mismatches, i.e., if in a string of pipe $\lambda/4$ equals the length of one of the pieces of pipe making up the string, then no reflection occurs at the mismatch of impedances and 100% of the signal is transmitted, and this same thing is true of all longer wave lengths.

The formula may be expressed thusly:

$$\lambda = \frac{2\pi\sqrt{E/\rho}}{\sqrt{k/m}}$$

where $\lambda$ is the wave length of the signal. Best transmission is obtained when $\lambda$ is significantly to the left of the point "2" on the curve of FIGURE 3, or is near the points 4/3 or 4/5 on that curve.

E is Young's modulus for the material (usually steel in drill pipe) out of which the string is made $\rho$ is the mass density of the material out of which the string is made $k$ is the constant of the spring in the signal generator $m$ is the effective vibrating mass in the signal generator.

As the wave length shortens toward the point where it is exactly twice as long as a pipe joint, the percent conduction or transmission commences to fall off and reaches a theoretical zero at exactly twice the length of a pipe joint, i.e., ½ wave per length of pipe.

Going further we find increasing conduction reaching a peak at waves 4/3rds of a pipe joint in length, and zero again at one full wave per joint of pipe. But at no wave length is the percent conduction of the signal as great as when the wave is close to 4 times longer than the pipe joints.

It may be observed from FIGURE 3, that the peaks of the curve occur when the wave length is 4 times as long as a pipe joint (i.e., ¼ wave fits a joint of pipe), when the wave is 4/3rds times as long as a pipe joint (i.e., ¾ths of a wave fits a point of pipe), and when the wave is ⅘ths times as long as a pipe point (i.e., when 5/4ths wave fits a joint of pipe). Failure to discover that in order to avoid large reflections and loss of conduction, the wave length of the signal being transmitted had to be such that a low odd multiple of ¼ wave length would fit onto each length of pipe, is one factor, apparently, that has frustrated commercial success of the many prior efforts in this field. Further it is apparent from FIGURE 3 that the higher odd multiples of ¼ are highly inefficient as compared to the ¼ wave and less per length of pipe, and even as compared to wave lengths 8/3rds times the pipe length (i.e., 3/8ths wave per length of pipe).

Thus in accordance with this invention, the signal generator is preferably predetermined to generate signals of a wave length significantly (in light of the FIGURE 3 curve) longer than twice the length of the joints of pipe composing the string, or with less efficiency at approximately the 4/3 or 4/5 portions of the FIGURE 3 curve.

From an inspection of FIGURE 3, it is apparent that while a wave 8/3rds times as long as the pipe joint length is significant, precisely 8/3rds is not critical, and the point is to use a wave length longer than one closely approaching but still significantly longer than twice the length of the joints of pipe, for most efficient operation. Phrased conversely, the waves may closely approach, but should still be significantly less than ½ wave length per length of pipe for most efficient operation.

This practice is highly effective to improve conductance when all units in the string are substantially identical. But consider places where the drill collars 13 which have a very large cross sectional area are joined to ordinary drill pipe 12 of the same length but which has a relatively much smaller cross sectional area. At this location it is possible to gain improved transmission by the use of what may be termed an impedance transformer 42 illustrated in FIGURE 5.

It has been found that when a "transformer" length of pipe 42 (FIG. 5) is inserted between the drill collars 13 and the drill pipe 12, which transformer length is approximately ¼ wave length long and has a metal cross sectional area (in a plane perpendicular to the axis of the subject pipe) approximately equal to the square root of the product of the cross sectional area of the pipe and the cross sectional area of the collars, then such transformer length operates to improve the transmission and reduce (in theory it will eliminate) the reflection at the joint between drill collar 13 and drill pipe 12.

It has been found preferable to conduct surveys using this invention with the drill string 10 suspended from the swivel 6 above the rig floor and with the slips not set. With such suspension and no kelly in the drill string, maximum efficiency is obtained, and preferable location of a velocity type pick-up or transducer is about ¼ to ⅜ wave length from the swivel 6 and preferable location of a force type transducer is immediately adjacent the swivel 6, it being possible to happen upon other locations at which standing wave phenomena produces nodes of no response at all.

It has also been found that efficiency of transmission can be improved by suspending the string with its lower end above the well floor, such that as nearly as possible under the circumstances, from its topmost suspension to the bottom the string is free from contact or connection with either the rotary table, rig, or well walls or floor, for each such contact effects at least some attenuation of the signal thereby imparting efficiency of the signal transmission.

Most efficient operation of the system herein described may be effected by electrical circuitry schematically indicated in FIGURE 4. There a detector 38, which in this instance is presumed to be accelerometer type transducer, is located on the string ¼ λ below the terminating mass at the swivel 6, there being no kelly in the string in the FIGURE 4 illustration. The detector's output is passed through an amplifier and a narrow band pass filter 39 adapted to amplify and pass only the fundamental frequency of the signal generator 33, and is finally displayed on any appropriate device, such as the pen-and-moving-paper tape recorder 41 or oscilloscope (not shown) wherein the receipt of each pulse is indicated and the time elapsed between them may be read as distance between the commencement of each pulse. As a further aid in detecting the intelligence signal pulses and discriminating against spurious signals, it may be desirable to use a detector with a resonant frequency the same as the frequency of the signal generator 33.

In the preferable form of this invention, the signal is chosen to be a nearly pure sine wave of a wave length exactly four times longer than uniform length joints of pipe making up the string. However, it is apparent to those skilled in the art that any more complex signal may be used so long as significant energy in the signal is of the required wave length, substantially at 4/5ths or 4/3rds times longer than or more than two times longer than the lengths of pipe composing the string, the range more than two times longer than the lengths of pipe being much preferred and even required in some applications of the invention.

Further, it is preferred to use a string of pipe composed of joints of uniform length, for example, all joints of 30-foot length. When the signal wave length is chosen to be sufficiently more than twice such joint length, however, the inclusion in the string of shorter joints of pipe and of miscellaneous reamers, stabilizers, sub, etc., does not defeat practical operation of the invention. "Drill string" as used in the claims hereof may therefore be constructed to include pipe and such miscellaneous items as reamers, etc.

Having a single longest piece of pipe in a string that is inconsistent with the teaching of this invention does not necessarily defeat practical operation in applications wherein highest efficiency is not required, but the longer pieces of pipe of which there are a significant plurality in the string, should be of a length with respect to the wave length of a principal energy of the signal, as has been above indicated.

While this invention has been described in a particular embodiment, it is obvious that many modifications may be made in the invention as herein particularly described without departure from the scope of the invention. For example, the intelligence signal may be generated in the form of pulses as above detailed, or in the form of a steady signal of varying frequency, and the invention as defined in many claims is still practical when the frequency range is selected to be entirely in the range substantially to the left of the zero point 2 in the curve of FIGURE 3. Accordingly, the particularity of this description is to be construed as illustrative only and not as any limitation upon the invention as defined in the following claims.

I claim:

1. A compression-wave generating system for providing a signal indication of drill string inclination in a well, comprising a sub joint affixed to the string located near the bottom of the well and having a cavity through which the drill mud passes as it goes through the string, a rod located within said cavity and forced downward by the flow of drill mud, a first urging means attached to said rod for resisting downward movement thereof, a first mechanical oscillator means within said cavity, said first oscillator means including a mass, a resilient member secured to said mass for vibrating said mass longitudinally with respect to said cavity, and a first latching means for cocking said first oscillator upon downward movement of said rod, a first control means attached to said first latching means cocked upon downward movement of said rod, said first control means including a first block movable axially and having a first and second chamber, said first chamber being located axially above said second chamber, a first high viscosity substance filling said first and second chambers, a first one-way valve between said first and second chamber which allows passage of said substance from said first chamber to said second chamber but not from said second chamber to said first chamber, said second chamber being filled upon downward movement of said rod to move said block to its lowermost position, a second urging means attached to said block for resisting downward movement thereof, and a wall between said first and second chambers having a narrow passage therein, a second mechanical oscillator means essentially identical to said first mechanical oscillator means and having a second latching means, a second control means attached to cocked upon downward movement of said rod, said second control means including a second block movable axially and having a third and fourth chamber, said third chamber being located axially above said fourth chamber, a second viscosity substance filling said third and fourth chambers, a second one-way valve between said third and fourth chambers which allows passage of said substance from said third chamber to said fourth chamber but not from said fourth chamber to said third chamber, said fourth chamber being filled upon downward movement of said rod to move said block to its lowermost position, a third urging means attached to said block for resisting downward movement thereof, and a pendulum-controlled, spherical distribution valve having a passage therein connecting said third and fourth chambers of more narrow dimension than the passage in said wall between said first and second chambers, said passage dimension being varied by the inclination of the well in accordance with the hanging position of the pendulum, said second urging means moving said first block upward when mud flow is shut off to allow said first substance to flow in the passage in the wall between said first and second chambers thereby filling said first chamber and emptying said second chamber at a predetermined rate depending on the size of the passage to determine the speed of the upward movement of said first block so that when said first block has moved upward a predetermined distance said first latching means is released causing said first oscillator means to produce a pulse, said third urging means moving said second block upward when mud flow is shut off to allow said second substance to flow in the passage of said pendulum-controlled, spherical distribution valve to fill said third chamber and empty said fourth chamber at a rate depending on the size of said passage to determine the speed of the upward movement of said second block so that when said second block has moved upward a predetermined distance said second latching means is released causing said second oscillator means to produce a pulse, whereby the timing between said first oscillator pulse vibration and said second oscillator pulse vibration is an indication of inclination.

2. A compression-wave mechanical generating system comprising an oscillator means, including a mass, a resilient member secured to said mass for vibrating said mass, and a latching means for cocking said oscillator means thereby energizing said resilient member, and a control means attached to said latching means including a block having a first and second chamber, a high viscosity substance filling said first and second chamber, a one-way valve between said first and second chamber for allowing passage of said substance from said first chamber to said second chamber, but not from said second chamber to said first chamber, an urging means attached to said block resisting the energization of said resilient member by said latching means, a holding means for preventing said urging means from resisting said energization of said resilient member, and a wall between said first and second chambers having a narrow passage therein, so that when said holding means is released said urging means moves said block to allow said substance to flow in the passage in the wall between said first and second chambers thereby filling said first chamber and emptying said second chamber at a predetermined rate depending on the size of the passage to determine the speed of movement of said block so that when said block has moved a predetermined distance said latching means is released causing said resilient member to oscillate the mass to produce a pulse.

3. A compression-wave mechanical generating system, comprising an oscillator means, including a mass, a resilient member secured to said mass for vibrating said mass, and a latching means for cocking said oscillator means thereby energizing said resilient member, and a control means attached to said latching means, including a block having a first and second chamber, a high viscosity substance filling said first and second chambers, a one-way valve between said first and second chambers for allowing passage of said substance from said first chamber to said second chamber, but not from said second chamber to said first chamber, an urging means attached to said block resisting the energizing of said resilient member by said latching means, a holding means for preventing said urging means from resisting said energization of said resilient member, and a pendulum-controlled, spherical distribution valve having a passage therein connecting said first and second chambers, said passage dimension being varied in accordance with the hanging position of the pendulum, so that when said holding means is released said urging means moves said block to allow said substance to flow in the passage in said pendulum-controlled, distribution valve thereby filling said first chamber and emptying said second chamber at a rate depending on the size of said passage to determine the speed of movement of said block so that when said block has moved a predetermined distance said latching means is released causing said resilient member to oscillate the mass to produce a pulse.

References Cited by the Examiner

UNITED STATES PATENTS

| | | | |
|---|---|---|---|
| 1,979,481 | 11/1934 | Lynch | 33—205 |
| 2,380,520 | 7/1945 | Hassler | 73—151 |
| 2,547,875 | 4/1951 | Krasnow | 340—18 X |
| 2,810,546 | 10/1957 | Eaton et al. | 73—151 |
| 3,014,282 | 12/1961 | Wist | 181—.5 X |

BENJAMIN A. BORCHELT, *Primary Examiner.*

KATHLEEN CLAFFY, SAMUEL FEINBERG,
*Examiners.*